Nov. 24, 1959 B. H. TONGUE 2,914,737

TRANSMISSION LINE TAP-OFF

Filed Dec. 2, 1955 2 Sheets-Sheet 1

INVENTOR
BEN H. TONGUE
BY Rines and Rines
ATTORNEYS

TRANSMISSION LINE TAP-OFF

Filed Dec. 2, 1955 2 Sheets-Sheet 2

INVENTOR
BEN H. TONGUE
BY Rines and Rines
ATTORNEYS

United States Patent Office 2,914,737

Patented Nov. 24, 1959

2,914,737

TRANSMISSION LINE TAP-OFF

Ben H. Tongue, Westfield, N.J.

Application December 2, 1955, Serial No. 550,649

5 Claims. (Cl. 333—8)

The present invention relates to transmission-line tap-offs for supplying energy from a transmission line to a plurality of outlets, and, more specifically, to tap-offs that are particularly adapted for use with artificial transmission-line sections.

Radio-frequency energy is frequently fed from a common transmission line to a plurality of outlets. Transmission lines receiving television signals, for example, are customarily provided with a plurality of tap-off branches at successively disposed points along the line for feeding the television signals to a plurality of receivers. These prior-art tap-off systems may be broadly classified as of one of two types. They either involve the use of a series resistor connected from one side of the transmission line to the tap-off branch, which may be termed a "resistive tap-off," or they involve the similar use of reactive elements, such as coils or condensers, which shall be referred to as "reactive tap-offs."

As will be more fully explained hereinafter, the resistive tap-off and the reactive tap-off are subject to serious disadvantages, particularly when the tap-off line is not terminated in a proper matching impedance and is of short dimensions. Such a condition, in fact, often obtains in practice. Under these circumstances, serious resonant trapping effects are produced at a plurality of frequencies.

An object of the present invention is to provide a new and improved tap-off that shall not be subject to such disadvantages and that, to the contrary, shall provide all of the primary advantageous features of the prior-art resistive and reactive tap-offs, while eliminating the disadvantageous features thereof.

A further object is to provide a new and improved tap-off of this character that is particularly adapted for use with artificial transmission lines.

Other and further objects will be explained hereinafter and will be more particularly pointed out in the appended claims.

The invention will now be described in connection with the accompanying drawings, Fig. 1 of which is a circuit diagram illustrating an artificial transmission line embodying tap-offs constructed in accordance with a preferred embodiment of the present invention; and Figs. 2 through 7 are graphs, later described, illustrating the electrical performance of different types of tap-offs.

Figure 2:
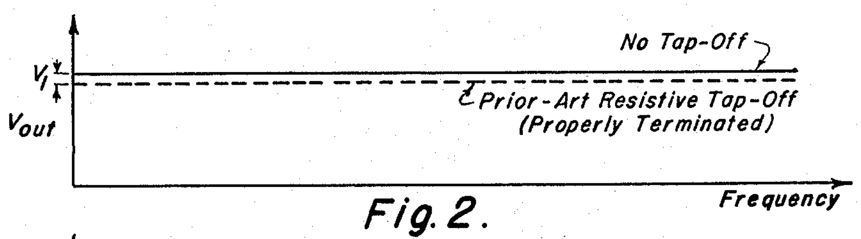

Referring to Fig. 2, the solid horizontal line labelled "No Tap-Off," illustrates that the output voltage $V_{out}$ (plotted along the ordinate) of a properly terminated transmission line unprovided with tap-off branches, is substantially constant over wide limits of variation in the frequency of the energy applied to the line (plotted along the abscissa). If one of the previously mentioned resistive tap-offs is connected at an intermediate point along the line in order to feed energy from the line to a corresponding outlet, the amplitude of the output voltage $V_{out}$ will become somewhat reduced, by a value $V_1$, as a result of the tapping of energy from the line, as illustrated by the horizontal dash-line shown below the solid line in Fig. 2 and labelled "Prior-Art Resistive Tap-Off (Properly Terminated)." This, again, is based upon the assumption that the tap-off branch is terminated with an appropriate matching impedance.

When, however, as is frequently the case in actual practice, the resistive tap-off branches are mis-terminated, then, as before described, resonant peaking effects are produced along the transmission line at a plurality of frequencies that are multiples of one another. The transmission-line output voltage $V_{out}$ is then not substantially constant with frequency variation so as to correspond uniformly to all frequencies in the desired relatively wide band of frequencies that are to be passed by the line. To the contrary, the resonant trapping effects introduce a plurality of sharp discontinuities or peaks 1, Fig. 3, in the output-voltage response. This represents a serious disadvantage, but one that the art has had to accept over the years.

Figure 4:
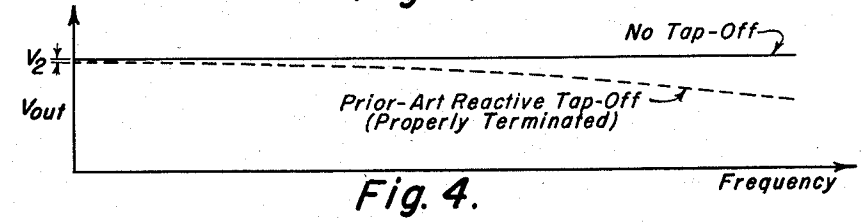
Figure 5:
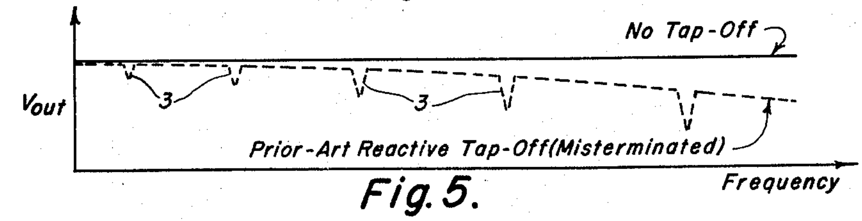

When resort is had to the use of the previously described prior-art reactive tap-offs, somewhat similar phenomena occur. The output voltage at low frequencies, in the case of a properly terminated reactive tap-off, however, is almost the same as the output voltage obtained when there are no tap-off branches connected to the line. Thus, in Fig. 4, the dash-line curve is shown at its left-hand extremity almost contiguous with the solid-line curve, being only a small voltage $V_2$ therebelow. Since the voltage $V_2$ of Fig. 4 is less than the voltage $V_1$ of Fig. 2, it is evident that the properly terminated reactive tap-off line has an advantage at the lower frequencies over the properly terminated resistive tap-off. If the frequency fed to the line increases, however, the value of the reactive tap-off voltage falls by successively increasing degrees, as shown by the dropping right-hand portion of the dash-line curve in Fig. 4. When the reactive tap-off is improperly terminated, moreover, the line becomes subject to resonant trapping effects 3, Fig. 5, similar to those described in connection with Fig. 3. In Fig. 5, however, the trapping effects manifest themselves as sharp, discontinuous valleys or voltage dips 3 of successively increasing amplitude, instead of the substantially constant amplitude voltage peaks accompanying the use of the resistive tap-off of Fig. 3. It will be observed that the resonant trapping effects in Fig. 5 become of quite sizeable amplitude at the higher frequencies.

In accordance with the present invention, the before-mentioned advantage of the reactive tap-off in the low-frequency range, Fig. 4, is obtained but with the advantage of a substantially constant response over the complete range of frequencies, as is typical of the properly terminated resistive tap-off, Fig. 2. Thus, in Fig. 6, it will be observed that the present invention provides an output-voltage response, illustrated by the dash-line curve, that differs from the solid-line "No Tap-Off" curve by a small voltage of value $V_3$ that is less than the voltage $V_1$ of Fig. 2 and almost as small as the voltage $V_2$ of Fig. 4. The output voltage in Fig. 6, however, does not drop down as does the output voltage of Fig. 4, but it maintains a substantially constant value throughout the wide frequency band.

Figure 3:
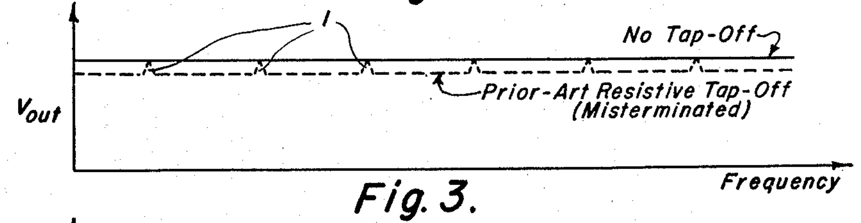

Even when the tap-off of the present invention is mis-terminated, it responds without either the sharp, discontinuous resonant trapping peaks 1 of the resistive tap-off, Fig. 3, or the even deeper trapping valleys 3 of the reactive tap-off, Fig. 5. Instead, as shown in the dash-line curve of Fig. 7, a very slightly and smoothly varying output-voltage response is produced which is void of sharp, discontinuous peaks or valleys, and remains very close to that which would be produced without the presence of tap-offs.

Figure 6:
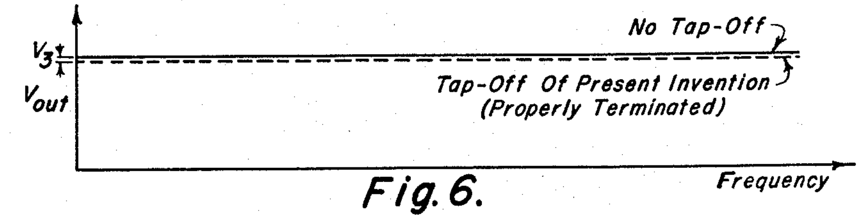
Figure 7:
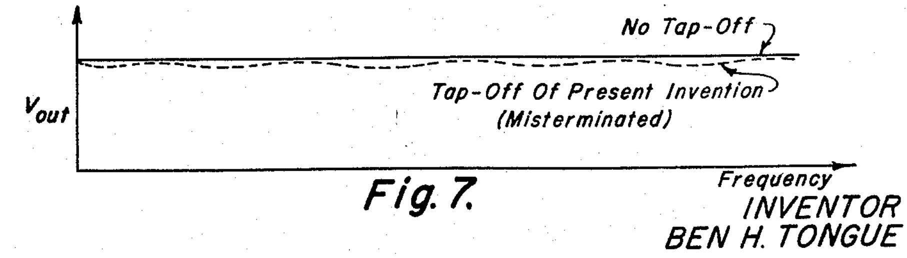

It remains to explain how the very desirable results of Figs. 6 and 7 are obtained.

Figure 1:
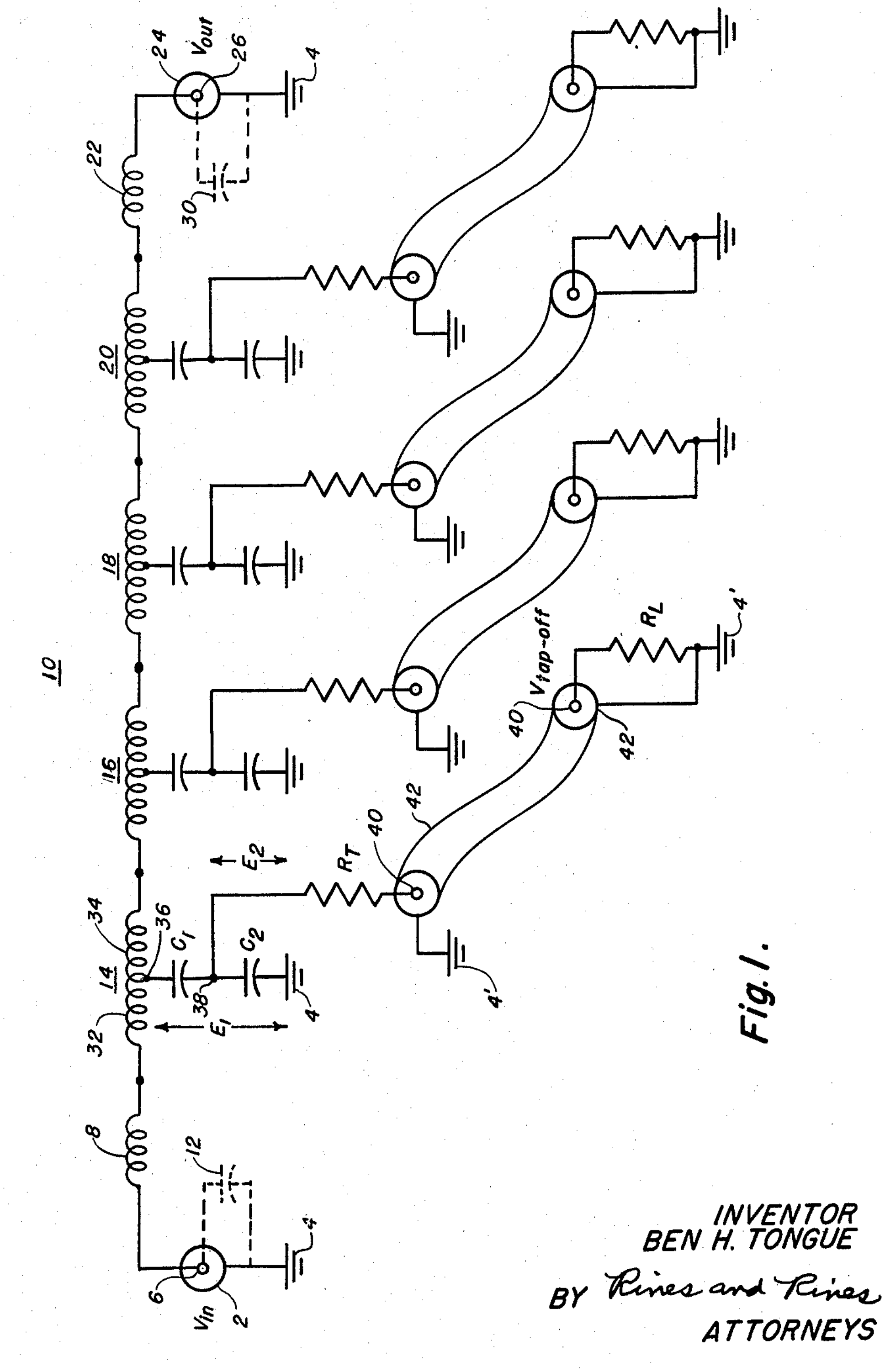

In Fig. 1, an input voltage $V_{in}$ is shown applied to a transmission line 10 from, for example, a coaxial-line input connector 2, 6. Any other type of input line or system may, of course, also be employed. The transmission line 10, for illustrative purposes, is shown comprising a plurality of successively connected filter or network sections 14, 16, 18, 20. The outer conductor 2 of the input connector 2, 6, is connected to one side of the line, illustrated as a grounded side 4, and the inner conductor 6 is connected through an input inductance 8 to the network section 14 of the line 10. The term "ground" is herein used to embrace not only actual earthing, but, also, chassis or other reference potential. The capacitance of the input connector 2, 6 is illustrated in dotted lines at 12, constituting a shunt path across the line between the outer and inner connector members 2 and 6. The transmission line 10 is terminated by an output inductance 22 and an output connector 24, 26 the shunt capacitance of which is shown dotted at 30. There is thus obtainable from the output network 22, 30, the output voltage $V_{out}$.

Each of the plurality of successively connected filter or network sections 14, 16, 18 and 20 comprising the artificial transmission line 10, is provided with series and shunt reactive elements. While only four preferably similar network sections are illustrated, it is, of course, to be understood, that more or less sections may also be employed, as may other filter-section configurations than the particular preferred networks hereinafter described. The construction of the preferred network may be explained in connection with, for example, the filter section 14, it being understood that the other sections of the line may be of the same form, as illustrated. It comprises a series reactor which is intermediately tapped at 36 into two sections 32 and 34. Separate reactors 32 and 34 may also be employed, if desired. At the intermediate tap 36, which is preferably the midpoint, a shunt network arm comprising a pair of series-connected capacitors $C_1$ and $C_2$ is connected to the ground terminal 4. The other network sections 16, 18 and 20 are shown of this same preferred T-configuration, each having a series arm comprising a pair of series inductances similar to 32 and 34 and a shunt arm comprising a pair of capacitors corresponding to $C_1$ and $C_2$.

In accordance with the present invention, the tap-off is taken from the point of connection 38 of the two series-connected capacitors $C_1$ and $C_2$ that comprise the shunt path to ground of the network section 14. A conductor is connected from the point 38 through a resistance $R_T$ to any desired tap-off branch line such as, for example, a section of coaxial line 40, 42. The resistance $R_T$ is connected to the inner conductor 40 of the branch line 40, 42 and the outer conductor 42 is connected by the ground terminal 4' to the ground terminal 4 of the line 10. The branch 40, 42 may be connected to any desired load for terminating the same, schematically represented by the resistance $R_L$, connected between the right-hand ends of the branch-line conductors 40 and 42.

The tap-off of the present invention from the artificial transmission line 10, therefore embodies a resistive connection $R_T$ to an intermediate point 38 of a shunt-reactance branch $C_1$, $C_2$ of each artificial transmission-line section 14, 16, 18, 20. It has been discovered that through utilizing a tap-off from such an intermediate connection point 38, so that there is shunt reactance (illustrated as the capacitance $C_1$) connected from the tap-off point to one side 36 of the line and also shunt reactance (illustrated as the capacitance $C_2$) connected from the tap-off point to the other or grounded side 4 of the line, thus to provide reactive voltage division, and by employing a resistive path $R_T$ from the reactive voltage-division tap-off point 38, the desirable features of prior-art tap-offs are maintained while the disadvantages thereof are eliminated, as previously described in connection with Figs. 6 and 7. The voltage $E_2$ that is tapped off between the reactive voltage-division tap-off point 38 and the ground terminal 4, and is fed to the load $R_L$ from the portion $C_2$ of the shunt reactive arm $C_1$, $C_2$ will be related to the complete voltage $E_1$ appearing across the shunt reactance $C_1$, $C_2$ by the expression $$E_2 \cong \frac{C_1}{C_1+C_2} E_1$$

providing the value of the sum of the series resistance $R_T$ and that of the load $R_L$ is greater than the impedance of the reactive element $C_2$ over the frequencies employed. Under such circumstances, the very desirable performance of Figs. 6 and 7 has been found to be produced in practice.

The present invention, therefore, not only provides excellent substantially constant performance over wide-frequency ranges when properly terminated tap-off branches are employed, but even when mis-matched loads are connected to the tap-off branch line, as, for example, when a home television receiver $R_L$ is tuned to different channel frequencies, resonant-peaking and trapping effects are avoided.

As an illustration, in the present-day VHF television bands, extending from channel 2, having a frequency of about 54 megacycles, through channel 13, having a frequency of about 216 megacycles, the following values of circuit elements of the illustrated constant K-type T-configuration networks have been found to produce the above-described results. The element $C_1$ may have a value of about 8.2 micromicrofarads; the condenser $C_2$, a value of about 18 micromicrofarads; the resistance $R_T$, a value of about 68 ohms; and the load $R_L$, a value of about 75 ohms.

The L-section networks 8, 12 and 22, 30 may be dispensed with if specially designed connectors 2, 6 and 24, 26 of appropriate impedance are employed. With conventional commercial coaxial connectors, however, the L-section networks serve as constant-K filters to present the desired impedance matching to the artificial transmission-line 14, 16, 18, 20, the individual network sections of which each comprise constant-K filters of, for example, 75 ohms impedance.

Further modifications will occur to those skilled in the art and all such are considered to fall within the spirit and scope of the invention as defined in the appended claims.

What is claimed is:

1. A transmission line for passing a band of frequencies having between its input and output a plurality of substantially capacitive reactances shunting the line and one or more tap-off branches each for connection to a corresponding load and each comprising a resistive connection to an intermediate point of one of the said reactances, whereby each load may be fed from a portion of the corresponding reactance, the value of the sum of the said resistive connection and the said load being greater than the impedance of the said portion of the reactance over the said band of frequencies.

2. An artificial transmission line for passing a band of frequencies comprising a plurality of successively connected network sections each having a shunt substantially capacitive reactive arm, and one or more tap-off branches each for connection to a corresponding load and each comprising a resistive connection to an intermediate point of one of the shunt reactive arms, whereby each load may be fed from a portion of the corresponding reactive arm, the value of the sum of the said resistive connection and the said load being greater than the impedance of the said portion of the reactive arm over the said band of frequencies.

3. An artificial transmission line for passing a band of frequencies comprising a plurality of successively connected network sections each having a shunt substantially capacitive reactive arm, and one or more tap-off branches each for connection to a corresponding load and each comprising a resistive connection to substantially the electrical mid-point of one of the shunt reactive arms, whereby each load may be fed from substantially one-half of the corresponding reactive arm, the value of the sum of the said resistive connection and the said load being greater than the impedance of the said half of the reactive arm over the said band of frequencies.

4. An artificial transmission line for passing a band of frequencies comprising a plurality of successively connected network sections each having a shunt reactive arm comprising a pair of series-connected capacitors, and one or more tap-off branches each for connection to a corresponding load and each comprising a resistive connection to the point of series connection of the capacitors of one of the shunt reactive arms, whereby each load may be fed from one of the capacitors of the corresponding reactive arm, the value of the sum of the said resistive connection and the said load being greater than the impedance of the said one capacitor over the said band of frequencies.

5. An artificial transmission line for passing a band of frequencies comprising a plurality of successively connected T-type network sections each having a series arm comprising a pair of series-connected inductances and a shunt reactive arm comprising a pair of series-connected capacitors, and one or more tap-off branches each for connection to a corresponding load and each comprising a resistive connection to the point of series connection of the capacitors of one of the shunt reactive arms, whereby each load may be fed from one of the capacitors of the corresponding reactive arm, the value of the sum of the said resistive connection and the said load being greater than the impedance of the said one capacitor over the said band of frequencies.

References Cited in the file of this patent

UNITED STATES PATENTS

| | | |
|---|---|---|
| 2,035,545 | Green | Mar. 31, 1936 |
| 2,578,836 | Potter | Dec. 18, 1951 |
| 2,790,956 | Ketchledge | Apr. 30, 1957 |

FOREIGN PATENTS

| | | |
|---|---|---|
| 902,027 | Germany | Jan. 18, 1954 |